United States Patent
Yamamoto et al.

(10) Patent No.: US 7,540,344 B2
(45) Date of Patent: Jun. 2, 2009

(54) CONTROL APPARATUS FOR HYBRID VEHICLE

(75) Inventors: Akihiro Yamamoto, Utsunomiya (JP); Kazuhisa Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/215,970

(22) Filed: Sep. 1, 2005

(65) Prior Publication Data
US 2006/0048982 A1 Mar. 9, 2006

(30) Foreign Application Priority Data
Sep. 3, 2004 (JP) ............... 2004-256859

(51) Int. Cl.
*B60W 20/00* (2006.01)
(52) U.S. Cl. ............... 180/65.2; 903/942
(58) Field of Classification Search ............... 180/65.2, 180/65.3, 65.4; 701/22; 123/198 F; 903/941, 903/942, 943
See application file for complete search history.

(56) References Cited

U.S. PATENT DOCUMENTS

| | | | | |
|---|---|---|---|---|
| 5,408,974 A | * | 4/1995 | Lipinski et al. | 123/481 |
| 5,806,617 A | * | 9/1998 | Yamaguchi | 180/65.2 |
| 6,397,140 B2 | * | 5/2002 | Minowa et al. | 701/96 |
| 6,449,552 B2 | * | 9/2002 | Ohba et al. | 701/89 |
| 6,499,449 B2 | * | 12/2002 | Michelini et al. | 123/90.15 |
| 6,638,195 B2 | * | 10/2003 | Williams | 477/5 |
| 6,829,524 B2 | * | 12/2004 | Chee | 701/1 |
| 6,885,920 B2 | * | 4/2005 | Yakes et al. | 701/22 |

FOREIGN PATENT DOCUMENTS

| | | |
|---|---|---|
| DE | 102 44 159 A1 | 4/2003 |
| EP | 1 354 746 A1 | 10/2003 |
| EP | 1 433 641 A1 | 6/2004 |
| JP | 10-147229 | 6/1998 |
| JP | 3099723 B2 | 8/2000 |
| JP | 2002-138876 A | 5/2002 |
| JP | 2002-305804 | 10/2002 |
| JP | 2004-169578 | 6/2004 |
| JP | 2004-208477 | 7/2004 |
| JP | 2004-210151 | 7/2004 |
| WO | 2004/045883 A2 | 6/2004 |

* cited by examiner

*Primary Examiner*—Frank B Vanaman
(74) *Attorney, Agent, or Firm*—Arent Fox LLP

(57) ABSTRACT

A control apparatus for a hybrid vehicle includes: a drive mode determination device that determines one drive mode from a plurality of drive modes based on a status of the vehicle, wherein the drive modes include: an engine stop motor drive mode in which the vehicle is driven by a driving force from a motor while stopping an engine; an idle cylinder deactivation motor drive mode in which the vehicle is driven by the driving force from the motor by operating a power generator as an electric motor by running the engine while maintaining the engine deactivated; and an engine drive mode in which the vehicle is driven by a driving force from the engine; and a transition rate modification device that, when it is determined by the drive mode determination device that a mode transition from a current drive mode to another drive mode should take place, modifies a transition rate for transitioning from the current drive mode to the another drive mode according to the drive mode to be transitioned.

9 Claims, 16 Drawing Sheets

FIG.18

| | | DRIVE MODE | | | | | | |
|---|---|---|---|---|---|---|---|---|
| | | a | b | c | d | e | f | g |
| | | I.S. | ENG STOP EV DRIVE | IDLE CYLINDER DEACTIVATION EV DRIVE | ENG DRIVE (ALL CYLINDER) | Rr REGEN. (ENG DRAG) | Rr REGEN. (IDLE CYLINDER DEACTIVATION) | Rr REGEN. (ENG STOP) |
| Fr | ENG | STOPPED | STOPPED | DRIVEN (CYLINDER DEACTIVATED) | DRIVING (ALL CYLINDER) | DRIVEN (CYLINDER DEACTIVATED) | DRIVEN (CYLINDER DEACTIVATED) | STOPPED |
| | MOT | STOPPED | STOPPED | DRIVING (IDLE) | DRIVING (ALL CYLINDER) | ZERO POWER | DRIVING (IDLE) | STOPPED |
| | AT | POSITION D N CONTROL | POSITION D N CONTROL | POSITION D N CONTROL | ZERO POWER START (GENERATING) | POSITION D DECELERATING | POSITION D N CONTROL | POSITION D N CONTROL |
| | Clutch | ENGAGED | ENGAGED | ENGAGED | POSITION D NORMAL | ENGAGED | ENGAGED | ENGAGED |
| Rr | MOT | STOPPED | DRIVING | DRIVING | NOT ENGAGED | REGENERATING | REGENERATING | REGENERATING |
| | | | | | STOPPED | | | |

CONTROL APPARATUS FOR HYBRID VEHICLE

BACKGROUND OF THE INVENTION

This application claims the priority of Japanese Patent Application No. 2004-256859, filed Sep. 3, 2004, the content of which is incorporated entirely by reference.

1. Field of the Invention

The present invention relates to a control apparatus for a hybrid vehicle including an engine and a motor as driving sources for driving the vehicle, a power generator driven by the engine, and an electric storage device for storing regeneration energy from the power generator and the motor.

2. Description of Related Art

A hybrid vehicle has been known in which an engine that is connected to a geared or continuous variable speed automatic transmission and drives main driving wheels (i.e., the front wheels or the rear wheels) and a motor that directly drives the axle shaft via reduction gears, in which the motor is connected to a battery and is placed on the crank shaft for restarting the engine that has been stopped. In such a hybrid vehicle, by properly employing the engine and the motor according to driving conditions, a reduction in fuel consumption and emission gas are achieved.

For example, Japanese Patent No. 3099723 proposes a technique that is capable of suitably controlling an engine by running the engine when the charged capacity of an electric storage device is less than a predetermined value, or when the maximum output torque of an electric motor that is driven by driving means is less than a target torque that is calculated by calculating means.

Furthermore, Japanese Unexamined Patent Application, First Publication No. 2002-138876 proposes another technique in which respective outputs of a rotating electrical machine and an engine are determined from a ratio of the outputs according to the charged capacity of a charging element and the requested accelerator amount, and the rotating electrical machine and the engine are controlled such that the respective outputs are obtained, thereby improving the fuel consumption or the like.

In a conventional vehicle without an electric motor, deceleration energy generated during deceleration of the vehicle is wasted in a form of heat by means of a friction brake. In a hybrid vehicle, such as ones described above, in order to achieve the effect of improving the fuel consumption, it is necessary to effectively regenerate such deceleration energy using one or more motors and to use the energy for reacceleration.

Furthermore, an enhanced effect of improving the fuel consumption is generally realized when regenerated energy is used when the vehicle is driven only by the motor (motor drive mode).

However, upon transitioning from a motor drive mode in which electric power stored in a battery is used to drive the vehicle to another drive mode in which an engine is started (engine drive mode), it is necessary to determine an EV drive allowable region by allowing for electric power required for restarting the engine that has been stopped. Upon transitioning to the engine drive mode, much electric power is required to raise the number of revolutions of the engine from zero to a speed sufficient to drive the vehicle. Especially, even more electric power is required when an immediate start of the engine is requested. Therefore, when the vehicle is driven only by the motor, electric power sufficient to transition to an engine drive mode must be saved in the battery all the time, which restricts the motor only drive allowable region. As a result, even when the motor is able to output the requested driving force, a transition to the engine drive mode may occur, which hinders achieving an improvement in the fuel consumption.

Accordingly, an object of the present invention is to provide a control apparatus for a hybrid vehicle that enlarges the motor only drive allowable region while maintaining good drivability and improves the fuel consumption.

SUMMARY OF THE INVENTION

A first aspect of the present invention is a control apparatus for a hybrid vehicle, including an engine as a first driving source for driving the vehicle, the engine being configured to support a deactivation operation in which an intake valve and an exhaust valve are closed; a motor as a second driving source for driving the vehicle; a power generator driven by the engine; and an electric storage device for storing regeneration energy from the power generator and the motor, the control apparatus including: a drive mode determination device that determines one drive mode from a plurality of drive modes based on a status of the vehicle, wherein the drive modes include: an engine stop motor (EV) drive mode in which the vehicle is driven by a driving force from the motor while stopping the engine; an idle cylinder deactivation motor (EV) drive mode in which the vehicle is driven by the driving force from the motor by operating the power generator as an electric motor by running the engine while maintaining the engine deactivated; and an engine drive mode in which the vehicle is driven by a driving force from the engine; and a transition rate modification device that, when it is determined by the drive mode determination device that a mode transition from a current drive mode to another drive mode should take place, modifies a transition rate for transitioning from the current drive mode to the another drive mode according to the drive mode to be transitioned.

According to the first aspect of the present invention, when it is determined by the drive mode determination device that a mode transition from a current drive mode to another drive mode should take place, a transition rate modification device modifies a transition rate for transitioning from the current drive mode to the another drive mode according to the drive mode to be transitioned. Therefore, it is possible to modify the required electric power according to the drive mode to be transitioned. In addition, it is possible to drive the vehicle in the current drive mode while saving electric power suitable to each of the drive modes. Thus, the engine stop EV drive mode allowable region and the idle cylinder deactivation EV drive mode allowable region can be enlarged, thereby improving the fuel consumption.

According to a second aspect of the present invention, in the first aspect of the present invention, an electric power setting device that sets an electric power that is used to drive the power generator as the electric motor based on the transition rate modified by the transition rate modification device may be provided.

According to the second aspect of the present invention, since appropriate electric power required for the revolution rate control operation of the engine can be set by the electric power setting device according to the drive mode to be transitioned, it is possible to improve the fuel consumption while maintaining good drivability. More specifically, the number of revolutions of the engine at the transition rate is modified by changing the transition rate depending on whether the drive mode is transitioned from the engine stop EV drive mode to the idle cylinder deactivation EV drive mode or to the engine drive mode. Then, by raising the number of revolutions when transitioning to the engine drive mode more promptly than when transitioning to the idle cylinder deactivation EV drive mode, the driving force can be provided promptly or the driving wheels can be changed swiftly. Thus, it is possible to ensure the drivability that the driver considers natural. Furthermore, upon transitioning from the engine stop EV drive mode to the idle cylinder deactivation EV drive mode, it is possible to set the electric power required for the revolution rate control operation of the engine to a value smaller than that of upon transitioning from the engine stop EV drive mode to the engine drive mode. Thus, the engine stop EV drive mode allowable region can be enlarged accordingly, contributing to an improvement in the fuel consumption.

According to a third aspect of the present invention, in the second aspect of the present invention, the electric power setting device may set the electric power based on an oil temperature of a transmission and an oil temperature of the engine.

According to the third aspect of the present invention, it is possible to set the electric power by the electric power setting device taking the viscosity of the oil which varies depending on the oil temperature into account. Thus, it is possible to transition between drive modes swiftly irrespective of the oil temperature, and it is possible to ensure the drivability that the driver considers natural. More specifically, when the oil temperature of the transmission and the oil temperature of the engine are low, the electric power is controlled taking the friction of the oil into account.

According to a fourth aspect of the present invention, in the second aspect of the present invention, the electric power setting device may set the electric power based on a rate of a change in a degree of an opening of an accelerator pedal.

According to the fourth aspect of the present invention, since the electric power is set by the electric power setting device according to the driving force requested by the driver, it is possible to improve the drivability. That is, when the rate of a change in a degree of an opening of an accelerator pedal is high and the driver is requesting a sharply increasing driving force, a relatively large electric power is set by the electric power setting device to swiftly transition to the engine drive mode. In contrast, when the rate of a change in a degree of an opening of an accelerator pedal is low and the driver is not requesting large driving force, relatively small electric power is set by the electric power setting device to gradually transition to the engine drive mode or to the idle cylinder deactivation operation EV drive mode where necessary.

According to a fifth aspect of the present invention, in the second aspect of the present invention, the electric power setting device may set the electric power based on a charge status of the electric storage device.

According to the fifth aspect of the present invention, the engine stop EV drive mode allowable region and the idle cylinder deactivation EV drive mode allowable region can be adjusted according to the charge state of the electric storage device. Thus, it is possible to improve the fuel consumption while maintaining a good driving performance of the vehicle. That is, the engine stop EV drive mode allowable region and the idle cylinder deactivation EV drive mode allowable region can be enlarged by transitioning between the drive modes gradually when the charge state of the electric storage device is high and the electric storage device is almost fully charged. In contrast, a good driving performance of the vehicle is ensured by limiting the usage of electric power stored in the electric storage device by swiftly transitioning to the engine drive mode when the charge state of the electric storage device is low.

In a sixth aspect of the present invention, in the second aspect of the present invention, the electric power setting device may set the electric power based on a target transition rate.

According to the sixth aspect of the present invention, the electric power required for the revolution rate control operation of the engine is set according to the target transition rate. Thus, it is possible to ensure the drivability that the driver considers natural while improving the fuel consumption. More specifically, when the target transition rate is high, it is possible to execute the revolution rate control operation of the engine swiftly by setting the electric power required for the revolution rate control operation to a relatively large value. Thus, it is possible to transition between drive modes swiftly, and it is possible to ensure the drivability that the driver considers natural. Furthermore, when the target transition rate is low, a transition between the drive modes takes place gradually by setting the electric power required for the revolution rate control operation to a small value. Thus, it is possible to improve the fuel consumption without giving the driver discomfort.

According to a seventh aspect of the present invention, in the first aspect of the present invention, a straight ahead or turning determination device that determines whether the vehicle is traveling straight ahead or turning may be provided, and a target number of revolutions of the engine may be changed according to a driving state determined by the straight ahead or turning determination device.

According to the seventh aspect of the present invention, since the target number of revolutions of the engine is changed according to the driving state determined by the straight ahead or turning determination device, it is possible to ensure the drivability that the driver considers natural. For example, when it is determined that the vehicle is turning, the target number of revolutions is set to a higher value than that of when it is determined that the vehicle is traveling straight ahead. Thus, it is possible to transition between drive modes swiftly by raising the number of revolutions of the engine more promptly than when the vehicle is traveling straight ahead.

According to an eighth aspect of the present invention, in the first aspect of the present invention, a road state determination device that determines whether a road on which the vehicle is traveling is a flat road or a climbing road may be provided, and a target number of revolutions of the engine may be changed according to a road state determined by the road state determination device.

According to the eighth aspect of the present invention, since the target number of revolutions of the engine is changed according to the driving state determined by the road state determination device, it is possible to ensure the drivability that the driver considers natural. For example, when it is determined that the road on which the vehicle is traveling is a climbing road, more driving force is required than when the vehicle is traveling a flat road. Thus, a transition between the drive modes can be taken place more swiftly than on a flat road by setting the target number of revolutions to a higher value than that of when it is determined that the road on which the vehicle is traveling is a flat road.

According to a ninth aspect of the present invention, in the first aspect of the present invention, one pair of the rear wheels and the front wheels may be driven by the engine and another pair may be driven by the motor.

According to the ninth aspect of the present invention, since one pair of the rear wheels and the front wheels can be driven by the engine and another pair can be driven by the motor, higher driving force can be ensured. Thus, it is possible to improve the driving performance.

According to a tenth aspect of the present invention, in the first aspect of the present invention, a clutch may be interposed between the motor and the driving wheels.

According to the tenth aspect of the present invention, the clutch is connected only when the driving force of the motor is required, whereas the motor is disconnected from the driving wheels when such driving force is not required. Accordingly, it is possible to reduce the friction from the motor, thereby contributing to an improvement in the fuel consumption.

According to an eleventh aspect of the present invention, in the first aspect of the present invention, a clutch may be interposed between the engine and the driving wheels.

According to the eleventh aspect, the clutch is connected only when the driving force of the engine is required, whereas the engine is disconnected from the driving wheels when such driving force is not required. Accordingly, it is possible to reduce the friction from the engine, thereby contributing to an improvement in the fuel consumption.

According to the first aspect of the present invention, the engine stop EV drive mode allowable region and the idle cylinder deactivation EV drive mode allowable region can be enlarged, thereby improving the fuel consumption.

According to the second aspect of the present invention, it is possible to improve the fuel consumption while maintaining good drivability.

According to the third aspect of the present invention and, it is possible to ensure the drivability that the driver considers natural.

According to the fourth aspect of the present invention, it is possible to improve the drivability.

According to the fifth aspect of the present invention, it is possible to improve the fuel consumption while maintaining a good driving performance of the vehicle.

According to the sixth aspect of the present invention and, it is possible to ensure the drivability that the driver considers natural while improving the fuel consumption.

According to the seventh and eighth aspects of the present invention, it is possible to ensure the drivability that the driver considers natural.

According to the ninth aspect of the present invention, higher driving force can be ensured, and it is possible to improve the driving performance.

According to the tenth aspect of the present invention, it is possible to reduce the friction from the motor, thereby contributing to an improvement in the fuel consumption.

According to the eleventh aspect of the present invention, it is possible to reduce the friction from the engine, thereby contributing to an improvement in the fuel consumption.

BRIEF DESCRIPTION OF THE DRAWINGS

FIG. 18 is a diagram illustrating statuses of the engine, the motor, and the transmission on the front side, and the clutch and the motor on the rear side for each drive mode.

DETAILED DESCRIPTION OF THE INVENTION

Hereinafter, a control apparatus for a hybrid vehicle according to embodiments of the present invention will be described with reference to the drawings.

Figure 1:
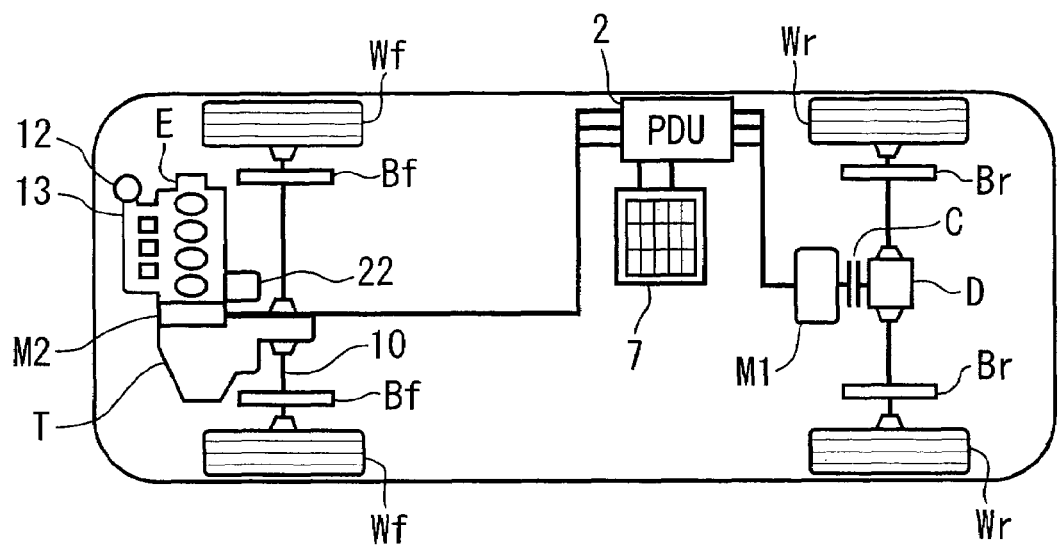
FIG. 1 is a schematic diagram of a four-wheel drive hybrid vehicle to which the present invention is applied.

FIG. 1 is a schematic diagram of a drive hybrid vehicle to which the present invention is applied.

The hybrid vehicle shown in FIG. 1 is a four-wheel drive vehicle that includes an engine E and a motor M2 in the front side of the vehicle, and a motor M1 that is connected to the an input of the differential gear D in the rear side. In this embodiment, the motor M1 in the rear side primarily functions as a traction motor, and the motor M2 in the front side primarily functions as a generator. Accordingly, these motors are refereed to as the traction motor M1 and the generator motor M2 where appropriate.

In this example, the motor M2 is positioned between the engine E and a transmission T having a clutch for the transmission. Furthermore, the clutch for the transmission (not shown) is provided that mechanically connects or disconnect the driving force output from the engine E or the motor M2 at the motor side end in the transmission T. An electric oil pump 22 is provided to supply working pressure to the clutch for the transmission. This electric oil pump 22 is powered by electric power provided from a battery 7.

A starting clutch C that mechanically disconnects or connects the driving force output from the motor M1 is provided between the motor M1 and the differential gear D.

Thus, the output of the engine E and the motor M2 in the front side is transmitted to the front wheels Wf via the transmission T whereas the output of the motor M1 in the rear side is transmitted to the rear wheels Wr via the clutch C and the differential gear D.

The motor M1 is controlled by a power drive unit (PDU) 2 in response to a control command from a motor ECU (TrMOT-ECU) 40 (see FIG. 3) as a motor control device. In the similar manner, the motor M2 is controlled by a power drive unit (PDU) 2 in response to a control command from a MOTOR ECU (MOT/GEN-ECU) 41 (see FIG. 3). It should be noted that although the PDU for controlling motor M1 and the PDU for controlling the motor M2 are actually separate units, they are illustrated as a single unit in FIGS. 1 and 2 for simplicity of illustration.

A high-voltage nickel hydrogen battery (storage battery) 7 is connected to the power drive unit 2 for sending or receiving electrical power to and from the motor M1 or the motor M2. An auxiliary battery (not shown) is connected to the battery 7 via a downverter that is a DC-DC converter, for driving various auxiliary devices.

The front wheels Wf that are driven by the engine E and the motor M2 have a front wheel brake Bf, and the rear wheels Wr driven by the motor M1 have a rear wheel brake Br.

The engine E is a so-called an inline four-cylinder engine, and an electronic control throttle 12 controlled by an engine ECU (FI-ECU) 42 is provided to an intake pipe 13 of the engine E. The engine E in this embodiment is an engine E that is capable of supporting a deactivation operation in which an intake valve and an exhaust valve are closeable. Furthermore, an accelerator position sensor for detecting how much a accelerator pedal (AP) (not shown) is depressed is connected to the engine ECU 42.

The engine ECU 42 calculates the amount of fuel injection from the depressed degree of the accelerator pedal or the like, and outputs a control signal dictating the amount of fuel injection to the electronic control throttle 12.

Figure 2:
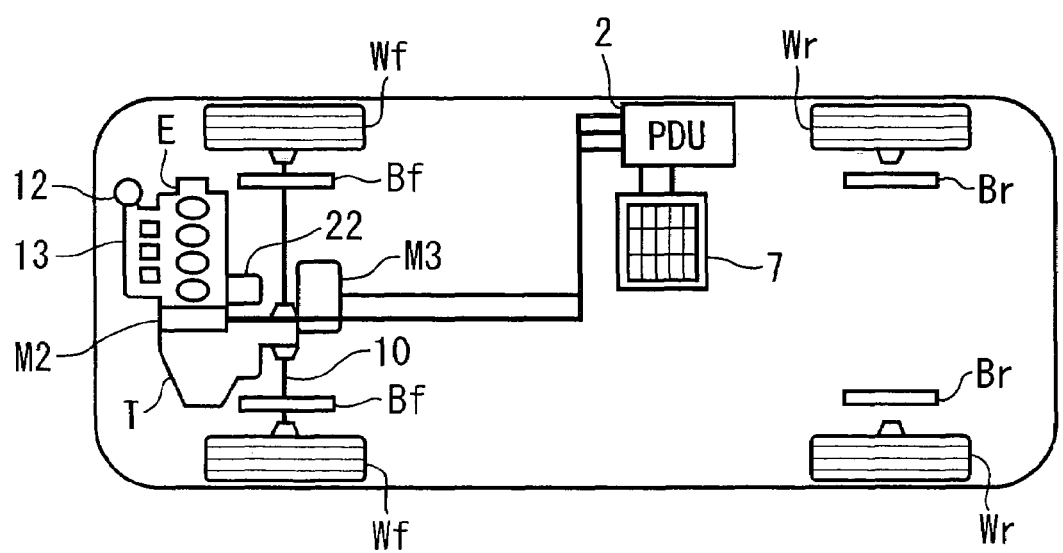
FIG. 2 is a schematic diagram of a two-wheel drive hybrid vehicle to which the present invention is applied.

FIG. 2 is a schematic diagram of another hybrid vehicle to which the present invention is applied.

The hybrid vehicle shown in FIG. 2 is different from the hybrid vehicle shown in FIG. 1 in that it is a two-wheel drive vehicle and includes a traction motor M3 and a generator motor M2 in the front side of the vehicle.

Furthermore, the traction motor M3 is configured such that an output shaft 10 can be connected or disconnected by means of a clutch for the transmission (not shown).

The hybrid vehicles shown in FIGS. 1 and 2 have two drive modes: an electric vehicle (EV) drive mode in which the vehicle can be driven only by the traction motor M1/M3, and an engine drive mode in which the vehicle is driven by at least the engine E. In addition, the hybrid vehicles support two modes in the EV drive mode: an engine stop EV drive mode in which the vehicle is driven by the driving force output from the traction motor M1/M3 while stopping the engine E in a state in which cylinders are deactivated; and an idle cylinder deactivation EV drive mode in which the vehicle is driven by driving force output from the traction motor M1/M3 by operating the generator motor M2 as an electric motor and maintaining the engine in the deactivation state while making the engine run in a predetermined number of revaluations (for example, the engine is made to run in the idle state).

Figure 3:
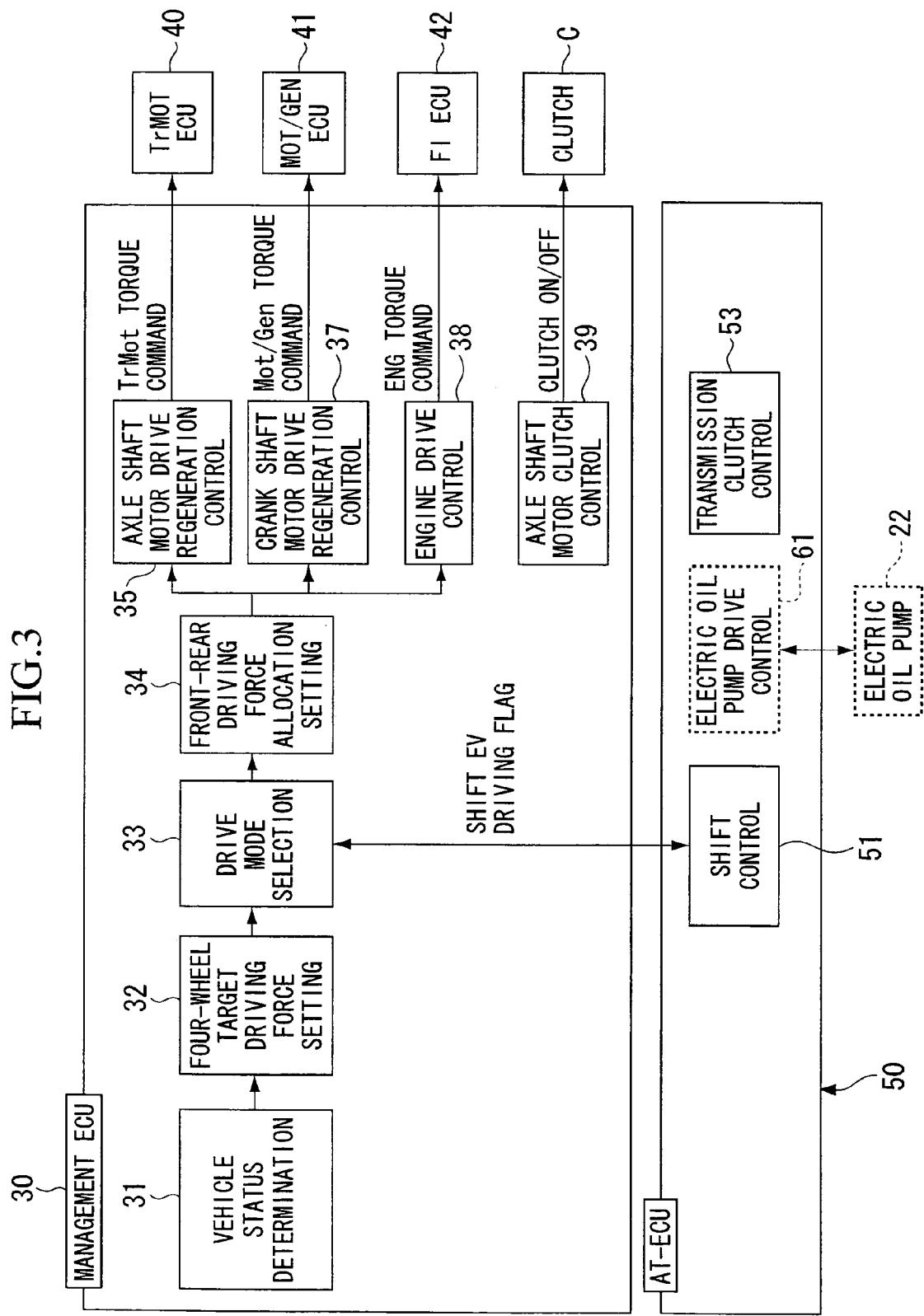
FIG. 3 is a block diagram of the ECU included in the hybrid vehicles shown in FIG. 1.

FIG. 3 is a block diagram of the ECU included in the hybrid vehicles shown in FIG. 1.

As shown in FIG. 3, this hybrid vehicle includes a management ECU 30 that performs the overall control on the vehicle, the traction motor ECU (TrMOT-ECU) 40 that controls the traction motor M1 for driving the wheels, the generator motor ECU (MOT/GEN-ECU) 41 that controls the generator motor M2, an FI-ECU 42 that controls the engine E, and an AT-ECU 50 that controls the starting clutch C and the transmission T.

In the management ECU 30, a vehicle status determination device 31 first determines the status of the vehicle based on information, such as signals from various sensors indicating the degree of depression of the accelerator pedal, the remaining capacity of the battery 7, or the like. Then, a four-wheel target driving force setting device 32 sets a target driving force required for the vehicle based on the determined status of the vehicle, and a drive mode selection device 33 selects one of the drive modes for the vehicle (e.g., from the engine stop EV drive mode, the idle cylinder deactivation EV drive mode, the engine drive mode, or the like).

Then, a front-rear driving force allocation setting device 34 allocates the driving force for each of the front wheels Wf and the rear wheels Wr. This allocation is varied depending on the drive mode.

Based on above-described allocation, the control is performed in the following manner.

When the traction motor M1 is used for controlling driving or regeneration, an axle shaft motor drive regeneration control device 35 controls the traction motor M1 by sending a TrMOT torque command from the axle shaft motor drive regeneration control device 35 to the TrMOT-ECU 40.

Furthermore, when the motor (generator motor) M2 that is connected to the crank shaft of the engine E is used for controlling driving or regeneration, a crank shaft motor drive regeneration control device 37 controls the generator motor M2 by sending a MOT/GEN torque command to the MOT/GEN-ECU 41.

Furthermore, the engine E is run, an engine drive control device 38 controls the engine E by sending an engine torque command to the FI-ECU 42. In this case, the engine may be controlled to be run at the idle speed while maintaining the deactivation operation where necessary.

Then, when the motor clutch (starting clutch) C is required to be controlled, a motor clutch control device 39 sends an ON/OFF control signal to the clutch C.

Next, the AT-ECU 50 will be described. The AT-ECU 50 includes a shift control device 51. This shift control device 51 is connected to a drive mode selection device 33 of the management ECU such that a flag indicating the engine stop EV drive mode or the idle cylinder deactivation EV drive mode and the shift stage are communicated each other. Furthermore, when the vehicle includes an electric oil pump 22 as shown in FIG. 1, an electric oil pump drive control device 61 for controlling the electric oil pump 22 is also provided. Additionally, a transmission clutch control device 53 for controlling the transmission clutch of the transmission T is provided.

Figure 4:
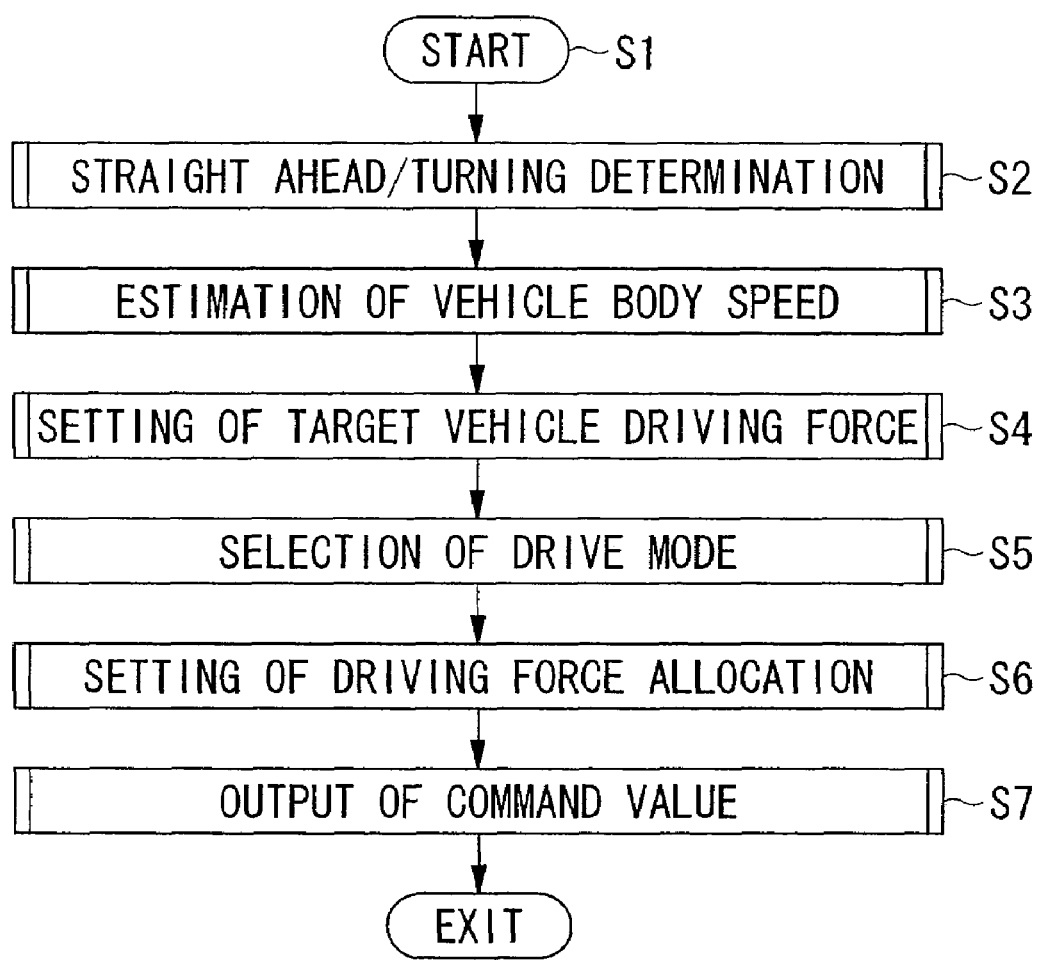
FIG. 4 is a flowchart of a main control executed in the hybrid vehicles shown in FIG. 1.

FIG. 4 is a flowchart of a main control executed in the hybrid vehicles shown in FIG. 1. Firstly, after a main control is started as shown in step S1, it is determined whether the vehicle is traveling straight ahead or turning in step S2. This straight ahead/turning determination is made based on the wheel speed of the four wheels, output values from a steering angle sensor, a yaw rate sensor, and a front-rear gravity sensor. When it is determined that the vehicle is traveling straight ahead, a straight ahead status flag is set. When it is determined that the vehicle is turning, a turning status flag is set and the turning radius of the vehicle is output.

In step S3, the vehicle body speed is estimated. This estimation of the vehicle body speed is made from the wheel speed of the four wheels, the number of rotations of the transmission gears, the number of rotations of the axle shaft drive motor, and the front-rear acceleration of the vehicle.

Figure 8:
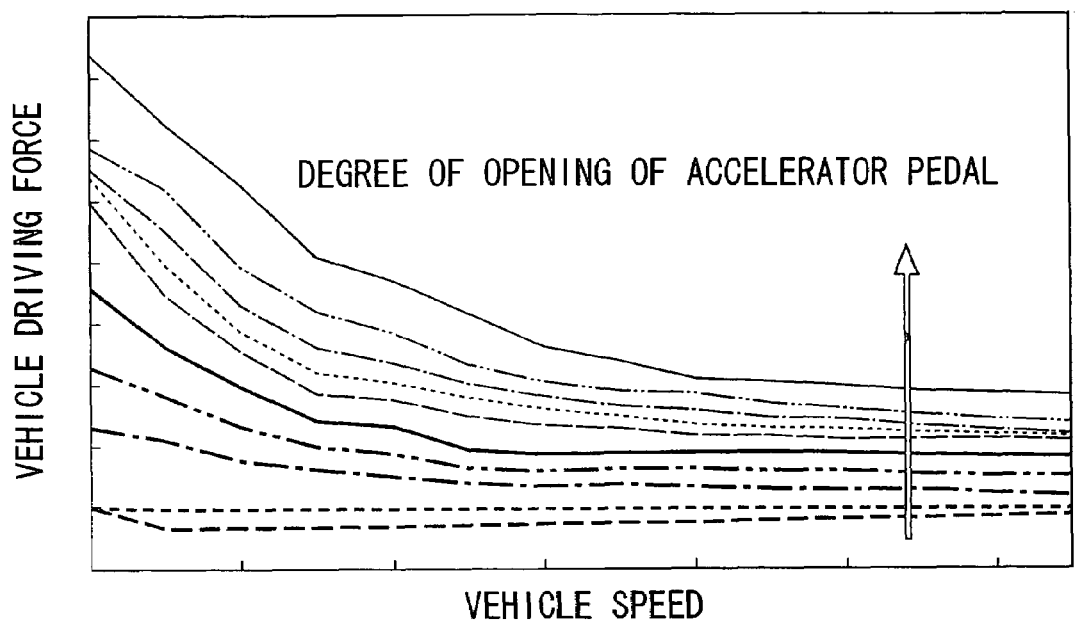
FIG. 8 is a graph of the target driving force map illustrating the relationship between the vehicle speed and the vehicle driving force according to the degree of the opening of the accelerator pedal.

In step S4, the target vehicle driving force is set. This target vehicle driving force is determined from the vehicle body speed that has been determined in step S3, the degree of the opening of the accelerator pedal, the brake switch, and the brake oil pressure (see FIG. 8, for example).

In step S5, the drive mode is selected. This processing for selecting the drive mode will be described in detail with reference to FIG. 5. In step S6, the driving force allocation ratio is set. Upon determining this driving force allocation ratio, the front-rear driving force allocation ratio/engine driving force and the crank shaft motor driving force allocation ratio are determined for each of the power mode and the economy mode.

In step S7, command values are output to each of the ECUs. More specifically, the target torque/the number of rotations of the axle shaft motor, the target torque/the number of rotations of the crank shaft motor, and the target degree of opening of the throttle are output as command values to ECUs 41, 40, and 42, respectively. Then, the processing of this flowchart is terminated.

Figure 5:
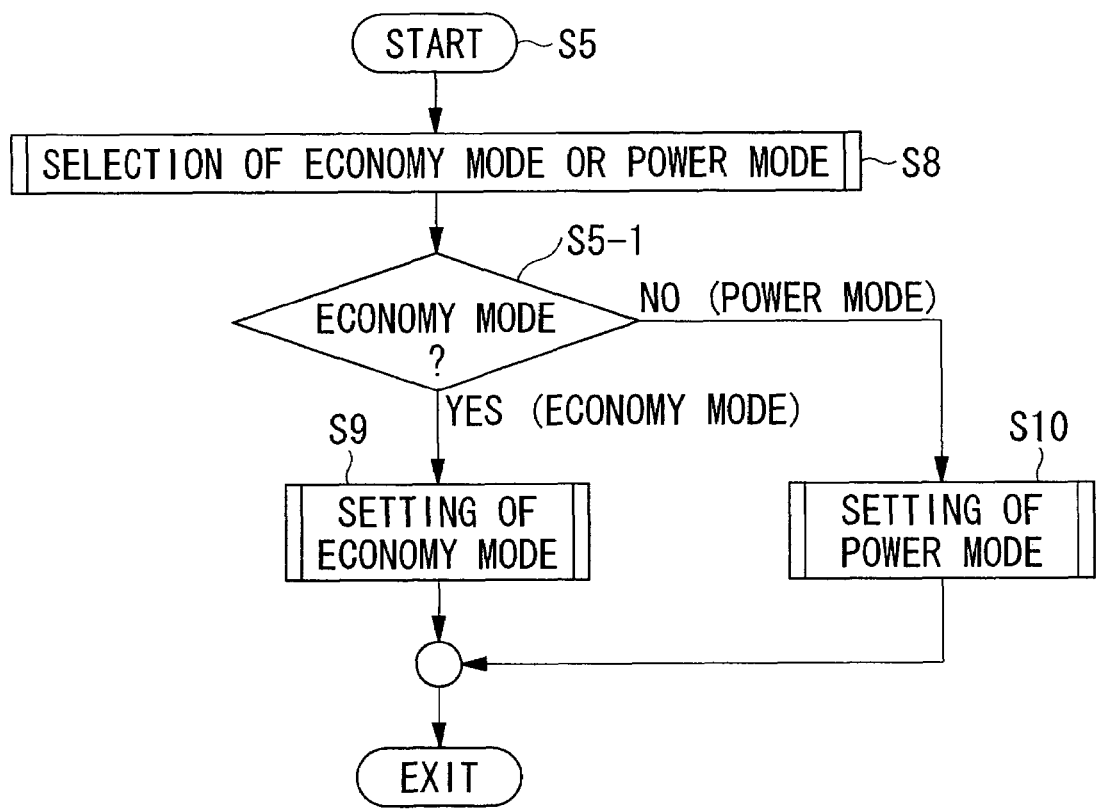
FIG. 5 is a flowchart of a mode selection control executed in the hybrid vehicles shown in FIG. 1.

FIG. 5 is a flowchart of the drive mode selection control executed by the hybrid vehicle shown in FIG. 1. As shown in FIG. 5, firstly, a mode selection processing from the economy mode and the power mode is executed in step S8. This selection of mode is made based on various types of information, such as an output from the economy mode/power mode selection switch (not shown), the status of the vehicle (whether the vehicle is slipping, turning, accelerating or decelerating), the weather, or the like.

Then, in step S5-1, it is determined whether or not the mode selected in step S8 is the economy mode. When the determination is evaluated as YES (the selected mode is the economy mode), the flow proceeds to step S9. Otherwise, when the determination is evaluated as NO (the selected mode is the power mode), the flow moves to step S10.

In step S9, settings of the economy mode (i.e., the drive mode with two-wheel drive) are made. This processing will be described in detail later with reference to FIG. 6.

Furthermore, in step S10, settings of the power mode (i.e., the drive mode with four-wheel drive) are made. In this power mode setting, the drive mode while the four-wheel drive mode is selected based on various types of information, such as the vehicle speed, the speed of the four wheels of the vehicle, the steering angle, the degree of the opening of the accelerator pedal, the battery charge status, or the like.

Then, after the processing in steps S9 or step S10 is executed, the processing of this flowchart is terminated, and the steps following step S6 are executed.

Figure 6:
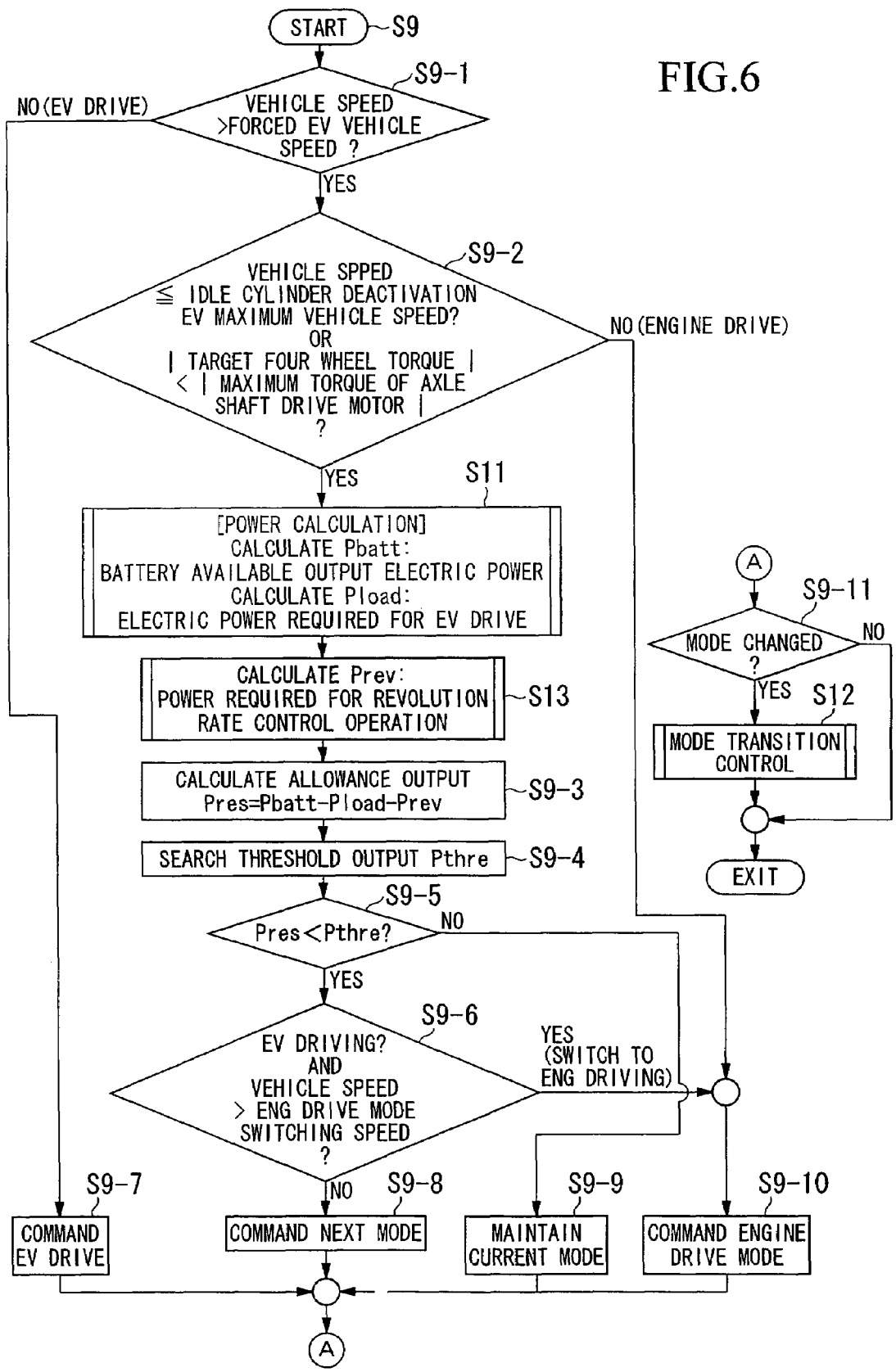
FIG. 6 is a flowchart of an economy mode setting control executed by the hybrid vehicles shown in FIG. 1.

FIG. 6 is a flowchart of the economy mode setting control executed in the hybrid vehicles shown in FIG. 1. As shown in FIG. 6, when the economy mode setting control is started in step S9, it is determined in step S9-1 whether or not the current vehicle speed exceeds the forced EV vehicle speed based on the information on the vehicle body speed that has been determined in step S3. When this termination is evaluated as YES, the flow proceeds to step S9-2. Otherwise, when the determination is evaluated as NO, the flow moves to step S9-7. In step S9-7, an EV drive command is output, and then the flow proceeds to step S9-11.

In step S9-2, it is determined whether or not at least one of the following conditions hold true: the current vehicle speed is equal to or less than the idle cylinder deactivation EV drive maximum vehicle speed based on the information on the vehicle body speed that has been determined in step S3, and the absolute value of the target driving force of the four wheels that has been determined in step S4 is equal to or less than the driving force calculated from the absolute value of the maximum torque of the axle shaft drive motor. When this determination is evaluated as YES, the flow proceeds to step S11. Otherwise, when the determination is evaluated as NO, the flow moves to step S9-10.

In step S11, the battery output available electric power (Pbatt) and the electric power (Pload) required only for performing the EV drive (the engine stop EV drive/the idle cylinder deactivation EV drive) by the axle shaft drive motor. The battery output available electric power (Pbatt) is calculated from the value of the battery temperature and the battery charge status information.

Figure 9:
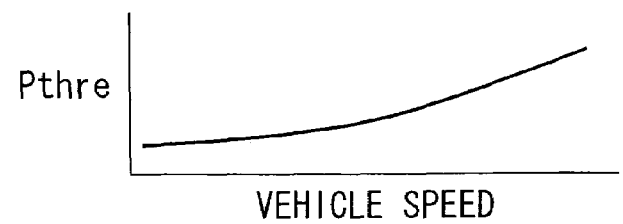
FIG. 9 is a graph illustrating the relationship between the vehicle speed and the threshold output.
Figure 10A:
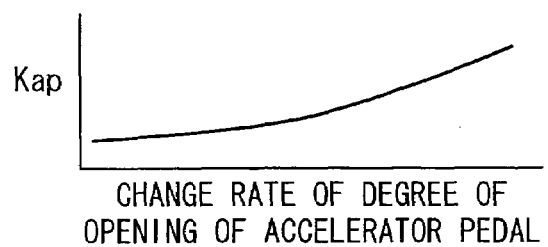
FIGS. 10A to 10G are graphs illustrating respective coefficients for the revolution rate control operation of each parameter for the torque base value for the revolution rate control operation.
Figure 10B:
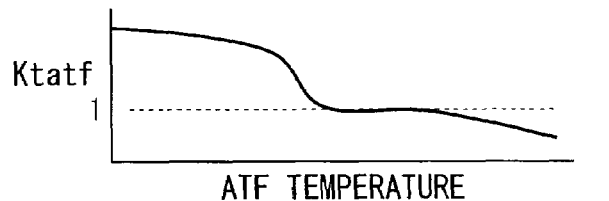
Figure 10C:
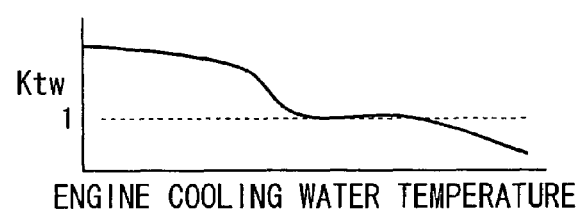
Figure 10D:
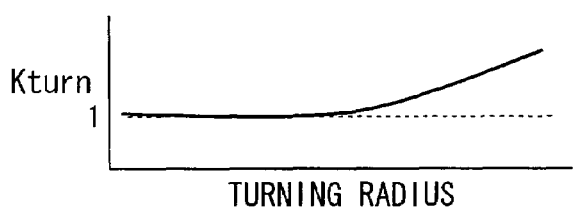
Figure 10E:
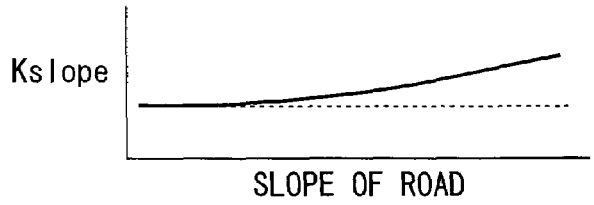
Figure 10F:
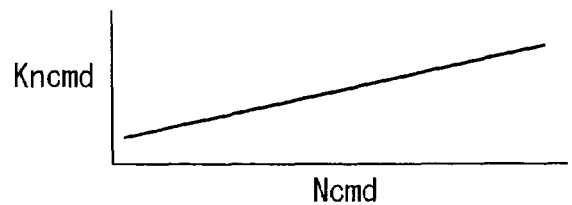
Figure 10G:
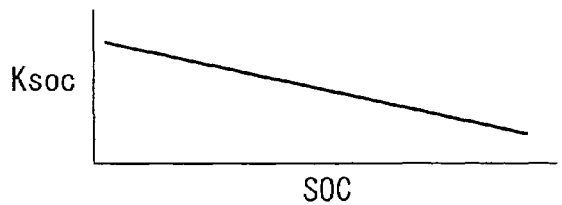

The electric power only required for driving the vehicle (Pload) can be obtained by determining a foot axis output required for the four wheel drive from the target four wheel driving force that has been determined in step S4 and the vehicle speed, and performing division using the mechanical/electric efficiency of the axle shaft motor. It should be noted that the calculation of the electric power only required for driving the vehicle (Pload) can alternatively be performed using the value of the battery terminal electric power sensor during the engine stop EV drive/the idle cylinder deactivation EV drive. In step S9-3, the allowance output (Pres) is calculated using the battery output available electric power (Pbatt) and the required electric power required for an EV drive (Pload) that have been determined in step S11, and the electric power required for the revolution rate control operation (Prev) that has been determined in step S13. Then, in step S9-4, the threshold output (Pthre) is searched based on the current vehicle speed (see FIG. 9).

In step S9-5, the allowance output (Pres) that has been determined in step S9-3 is compared against the threshold output (Pthre) that has been determined in step S94 to determine whether or not the threshold output (Pthre) is greater than the allowance output (Pres). When this determination is evaluated as YES (i.e., when Pthre is greater than Pres), the flow proceeds to step S9-6. Otherwise, the flow moves to step S9-9 when the determination is evaluated as NO (i.e., when Pthre is not greater than Pres).

In step S9-6, it is determined whether or not the current drive mode is the EV drive mode and the current vehicle speed exceeds the engine drive switching vehicle speed. The flow proceeds to step S9-10 when the determination is evaluated as YES; otherwise, the flow moves to step S9-8. In step S9-10, a command requesting a transition to engine drive mode is output, and the flow then proceeds to step S9-11.

In step S9-8, a command requesting a transition to the next mode is output. That is, a command requesting a transition to the idle cylinder deactivation EV drive mode is output when the current mode is the engine stop EV drive mode. Alternatively, a command requesting a transition to engine drive mode is output when the current mode is the engine stop idle cylinder deactivation EV drive mode. In step S9-9, a command requesting to maintain the current mode is output. Then, after executing the processing in step S9-8 or S9-9, the flow proceeds to step S9-11.

In step S9-11, it is determined whether or not a mode transition command has been issued. When this determination is evaluated as YES, the flow proceeds to step S12. Otherwise, the processing of this flowchart is terminated without executing additional steps when the determination is evaluated as NO. In step S12, the mode transition control is executed. More specifically, in order to transition between drive modes, a limiting/filtering processing is executed for each of the torque and the number of rotations of the axle shaft drive motor M1, the torque and the number of revolutions of the engine E, and the torque and the number of rotations of the crank shaft driving motor M2, and command values for the mode transition are output to the engine E and the motor M1 and M2. Then, the processing of this flowchart is terminated.

Figure 7:
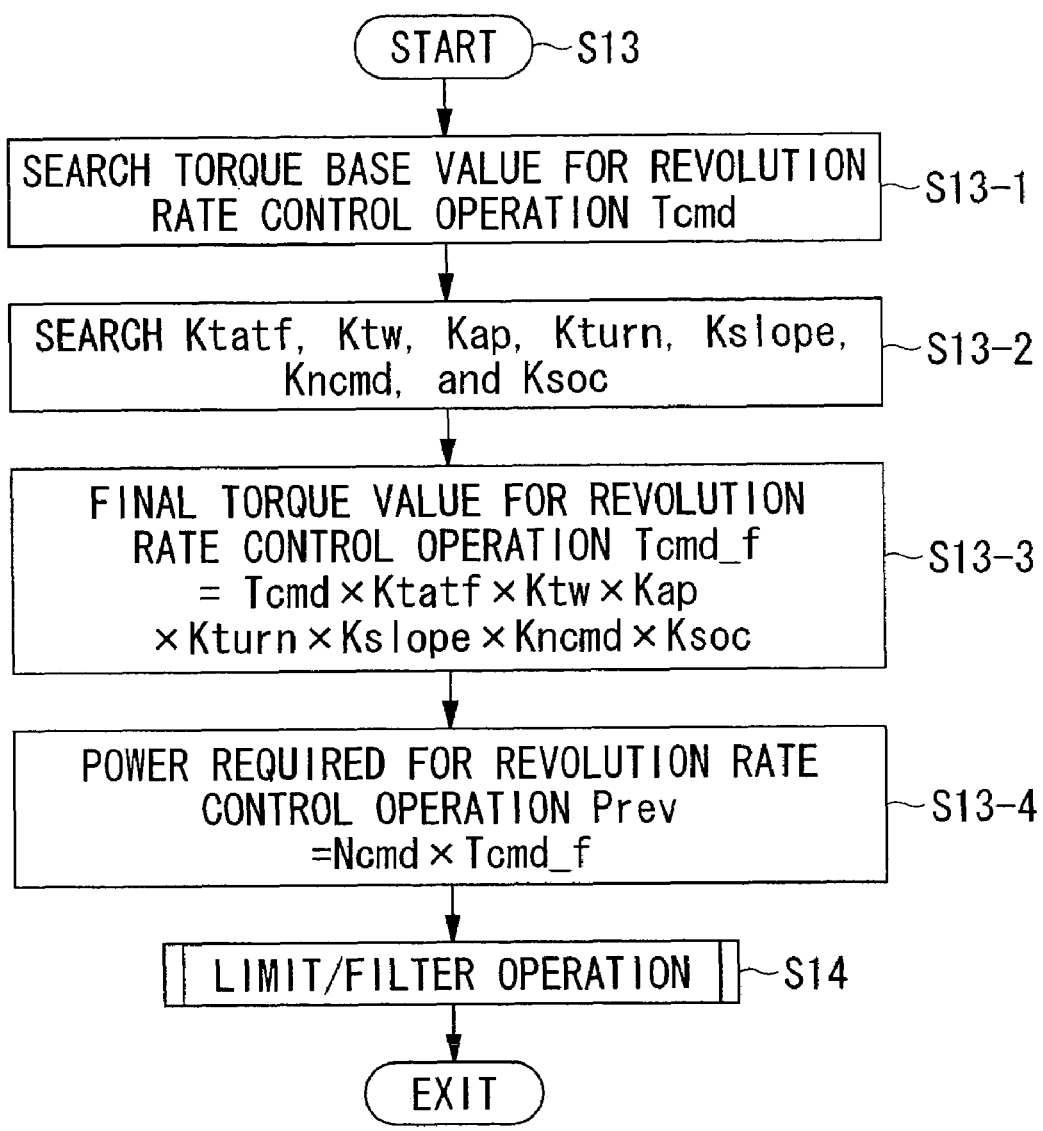
FIG. 7 is a flowchart of an electric power calculation control for a revolution rate control operation executed in the hybrid vehicles shown in FIG. 1.

FIG. 7 is a flowchart of an electric power calculation control for a revolution rate control operation executed in the hybrid vehicles shown in FIG. 1. As shown in FIG. 7, after a calculation of the electric power required for the revolution rate control operation is started in step S13, a torque base value for the revolution rate control operation (Tcmd) is searched based on the current drive mode and the next drive mode in step S13-1. A search table used upon searching the torque base value for the revolution rate control operation for switching from the current drive mode to the next drive mode is shown in Table 1.

TABLE 1

Tcmd (the torque base value for the revolution rate control operation) Search Table

| Current Drive Mode | Next Drive Mode | Tcmd |
|---|---|---|
| Engine Stop EV | Idle Cylinder Deactivation EV | Tcmd12 |
|  | ENG drive | Tcmd13 |
| Idle Cylinder Deactivation EV | Engine Stop EV | Tcmd21 |
|  | ENG drive | Tcmd23 |
| ENG drive | Engine Stop EV | Tcmd31 |
|  | Idle Cylinder Deactivation EV | Tcmd32 |

Then, in step S13-2, coefficients for the revolution rate control operation of each parameter for the torque base value for the revolution rate control operation are searched (see FIGS. 10A to 10G). More specifically, using the map shown in FIG. 10A, a coefficient for the revolution rate control operation for the rate of the change in the degree of the opening of the accelerator pedal (Kap) is searched from the rate of the change in the degree of the opening of the accelerator pedal. Furthermore, using the map shown in FIG. 10B, a coefficient for the revolution rate control operation for the ATF temperature, i.e., the oil temperature of the transmission (Ktatf), is searched from the ATF temperature. Furthermore, using the map shown in FIG. 10C, a coefficient for the revolution rate control operation for the temperature of the engine cooling water (Ktw) is searched from the temperature of the engine cooling water. Furthermore, using the map shown in FIG. 10D, a coefficient for the revolution rate control operation (Kturn) for the turning radius is searched from the turning radius of the vehicle. Furthermore, using the map shown in FIG. 10E, a coefficient for the revolution rate control operation for the slope of the road (Kslope) is searched from the slope of the road. Furthermore, using the map shown in FIG. 10F, a coefficient for the revolution rate control operation for the target number of revolutions of the engine (Kncmd) is searched from the target number of revolutions of the engine. Furthermore, using the map shown in FIG. 10G a coefficient for the revolution rate control operation for the battery charge status (Ksoc) is searched from the battery charge status.

In step S13-3, the torque base value for the revolution rate control operation that is determined using the above-described Table 1 is multiplied by each of the coefficients that have been determined in step S13-2 to determine a final torque value for the revolution rate control operation (Tcmd_f). Then, in step S13-4, the final torque value for the revolution rate control operation obtained in step S13-3 is multiplied by the target number of rotations for the revolution rate control operation to determine an electric power required for the revolution rate control operation (Prev). Then, in step S14, the limiting/filtering processing is executed. More specifically, the filtering and limiting operation is executed to prevent the calculated value of the electric power for the revolution rate control operation that has been determined in step S13-4 from being significantly varied in the calculation, or being too great or too small. Then, the processing of this flowchart is terminated.

Figure 11:
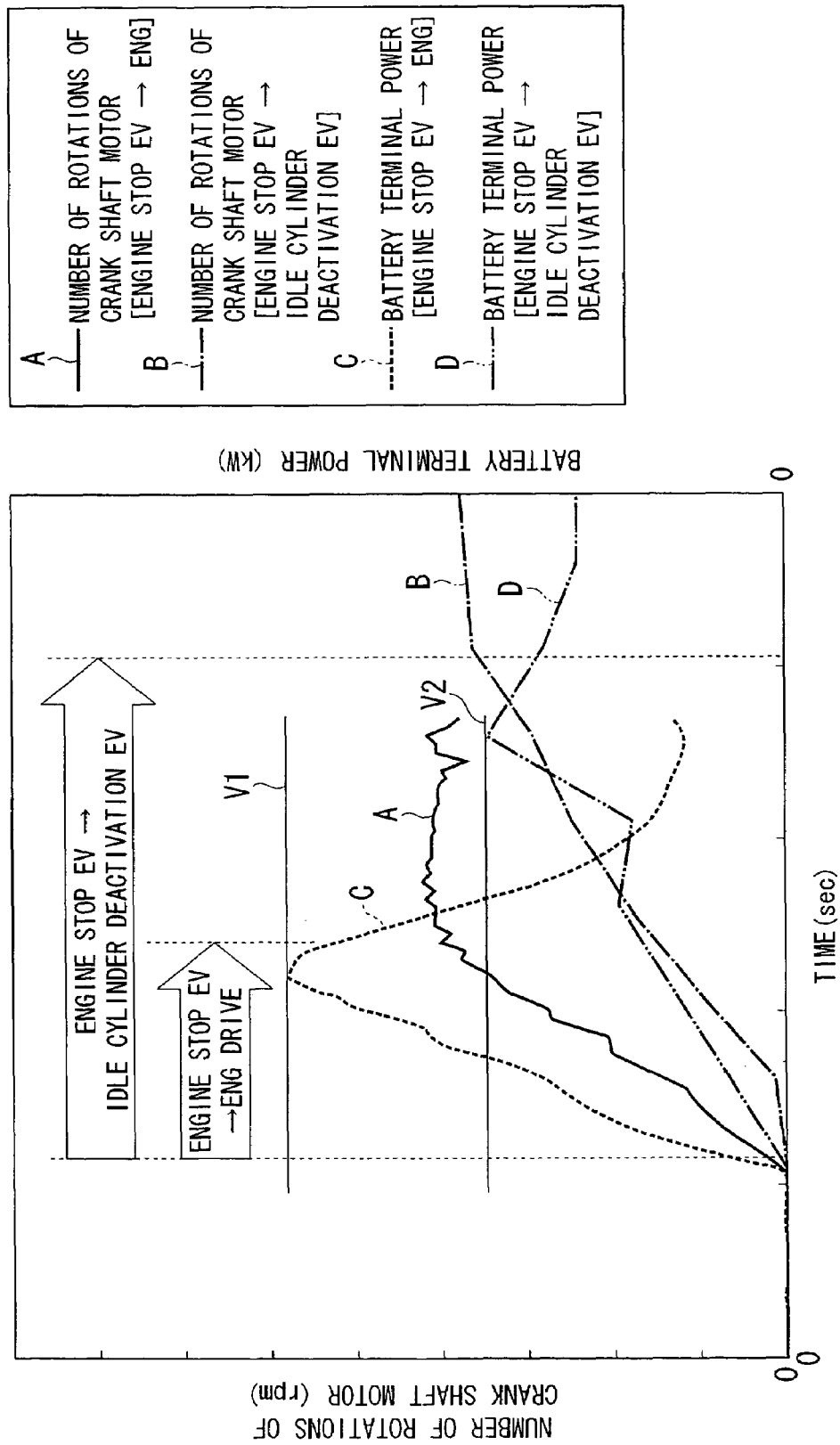
FIG. 11 is a graph illustrating the change in the number of rotations of the crank shaft motor and the battery terminal electric power over time during a mode transition.

FIG. 11 is a graph illustrating the change in the number of rotations of the crank shaft motor and the battery terminal electric power over time during a mode transition. As shown in FIG. 11, when the mode transitions from the engine stop EV drive mode to the engine drive mode, since the number of revolutions of the engine E is required to be raised from zero to the drive speed, the battery 7 requires much electric power for increasing the number of rotations of the crank shaft motor M2 that drives the engine E (see Line A and Line C). In contrast, when the mode transitions from the engine stop EV drive mode to the idle cylinder deactivation EV drive mode, it is sufficient to run the engine by gradually raising the number of revolutions of the engine E from zero in the idle state. Thus, the electric power from the battery 7 that is required to increase the number of rotations of the crank shaft motor M2 that drives the engine E remains small (see Line B and Line D).

Figure 12:
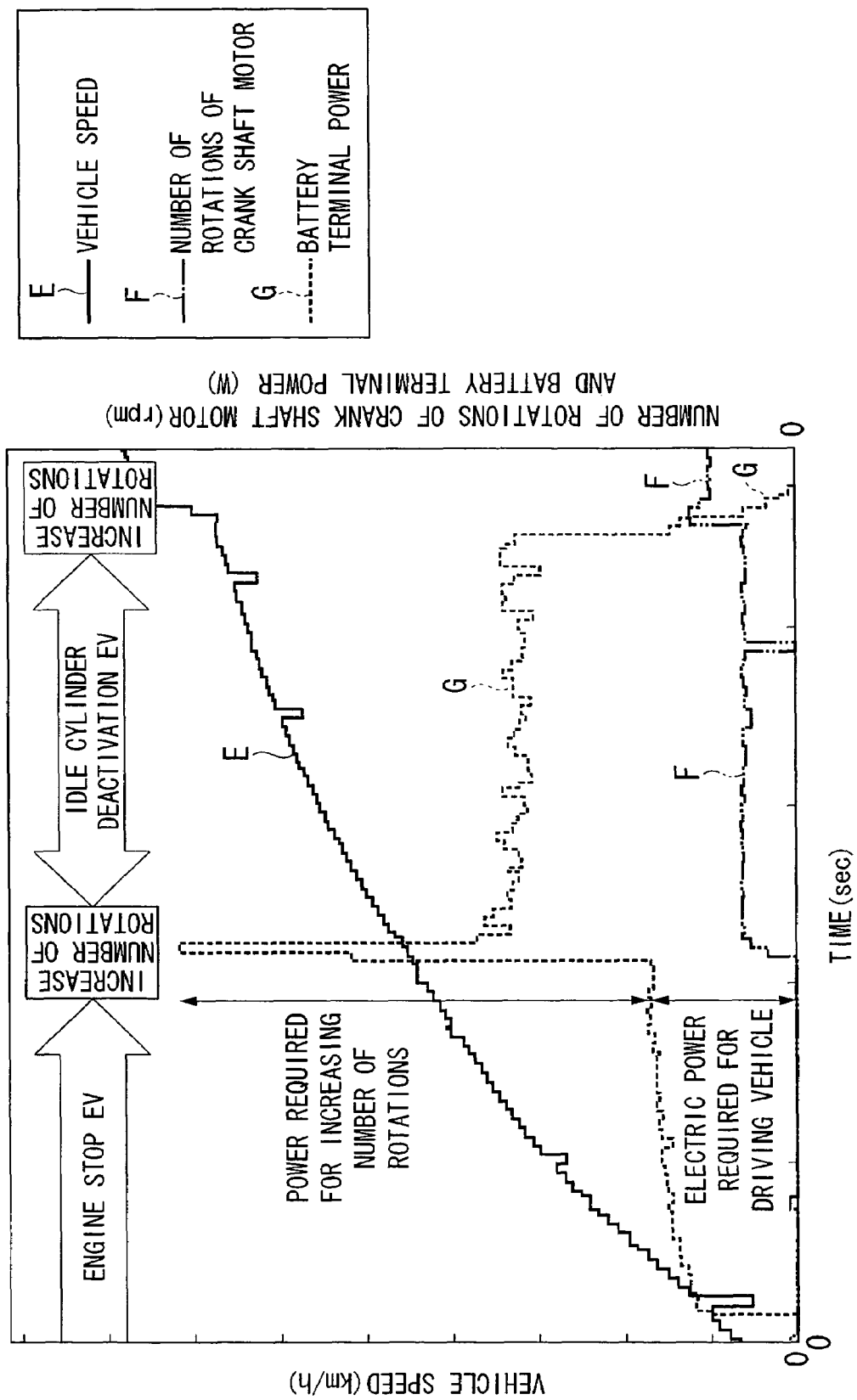
FIG. 12 is a graph illustrating the change in the vehicle speed, the number of rotations of the crank shaft motor, and the battery terminal electric power over time during a mode transition.

FIG. 12 is a graph illustrating the change in the vehicle speed, the number of rotations of the crank shaft motor, and the battery terminal electric power over time during a mode transition. As shown in FIG. 12, at the low vehicle speed zone in which the vehicle speed is close to zero, the vehicle is driven in the engine stop EV drive mode, in which the electric power output from the battery 7 (the battery terminal electric power) is approximately close to the electric power required to drive the vehicle. Then, when the vehicle speed is gradually increased, by transitioning to the idle cylinder deactivation EV drive mode rather than to the engine drive mode, it is not necessary to set large values for the number of rotations requested for the crank shaft motor M2 and to save the electric power required to increase the target number of rotations. Then, after the vehicle speed is increased further and the driving motor M1 cannot supply the enough power for the requested driving force, the mode transitions to the engine drive mode. Upon the transition, since the engine E is running at the idle speed, the electric power required to raise the number of revolutions of the engine E to the drive speed can be saved.

Furthermore, in this embodiment, when it is determined that a mode transition from the current drive mode to another drive mode should take place, the transition rate for driving the crank shaft motor (front motor) M2 is changed according to the drive mode to be transitioned. This will be explained with reference to FIGS. 13 to 16.

Figure 13:
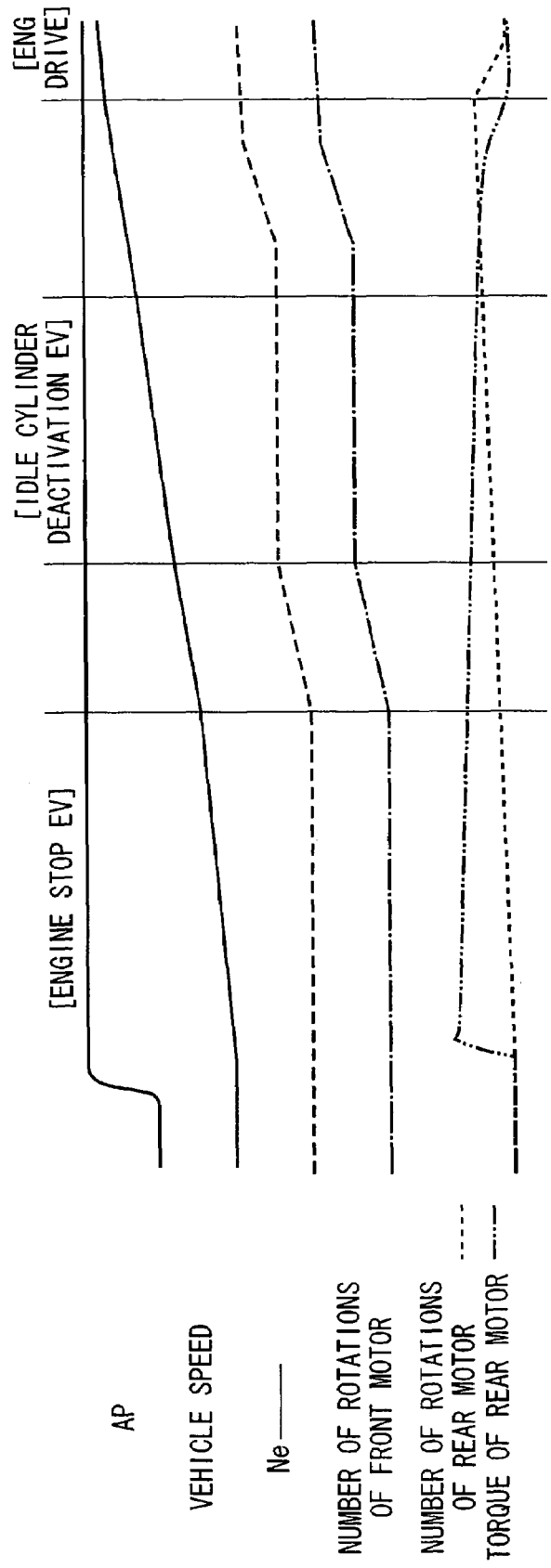
FIG. 13 is a diagram illustrating change in the degree of the opening of the accelerator pedal, the vehicle speed, the number of revolutions of the engine, the engine temperature, the number of rotations of the front motor, the number of rotations of the rear motor, and the rear motor torque over time in an embodiment of the present invention.
Figure 14:
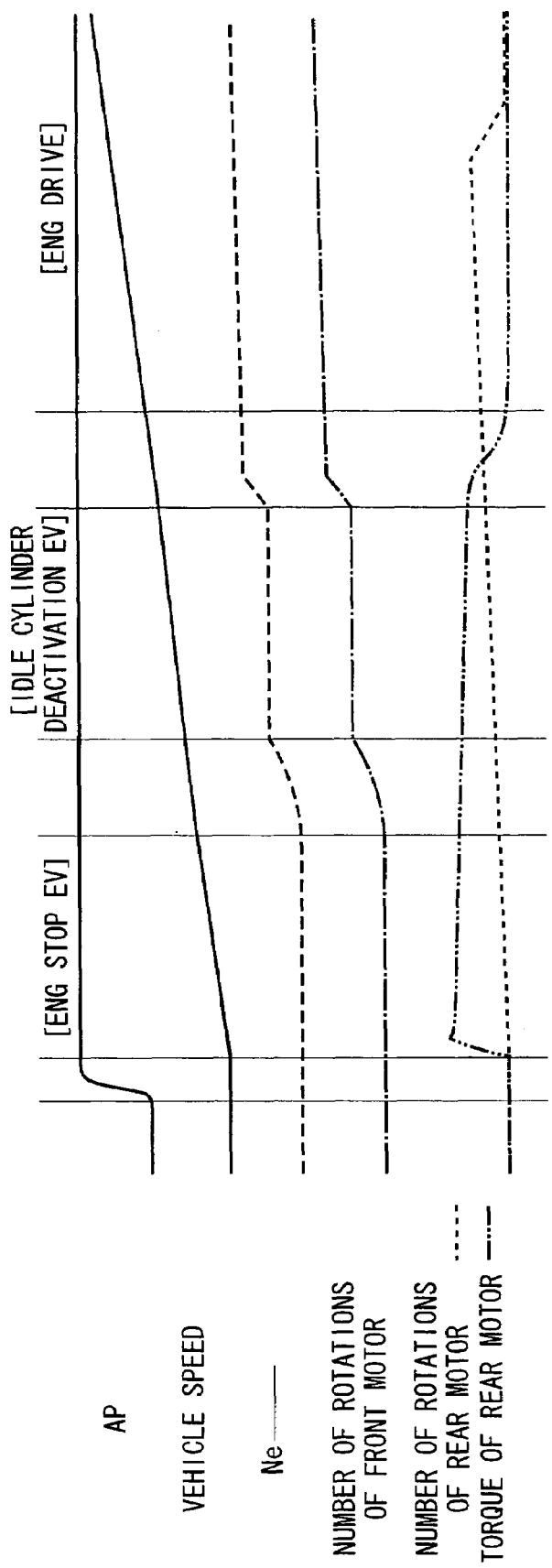
FIG. 14 is a diagram illustrating change in the degree of the opening of the accelerator pedal, the vehicle speed, the number of revolutions of the engine, the engine temperature, the number of rotations of the front motor, the number of rotations of the rear motor, and the rear motor torque over time in a comparative example.
Figure 15:
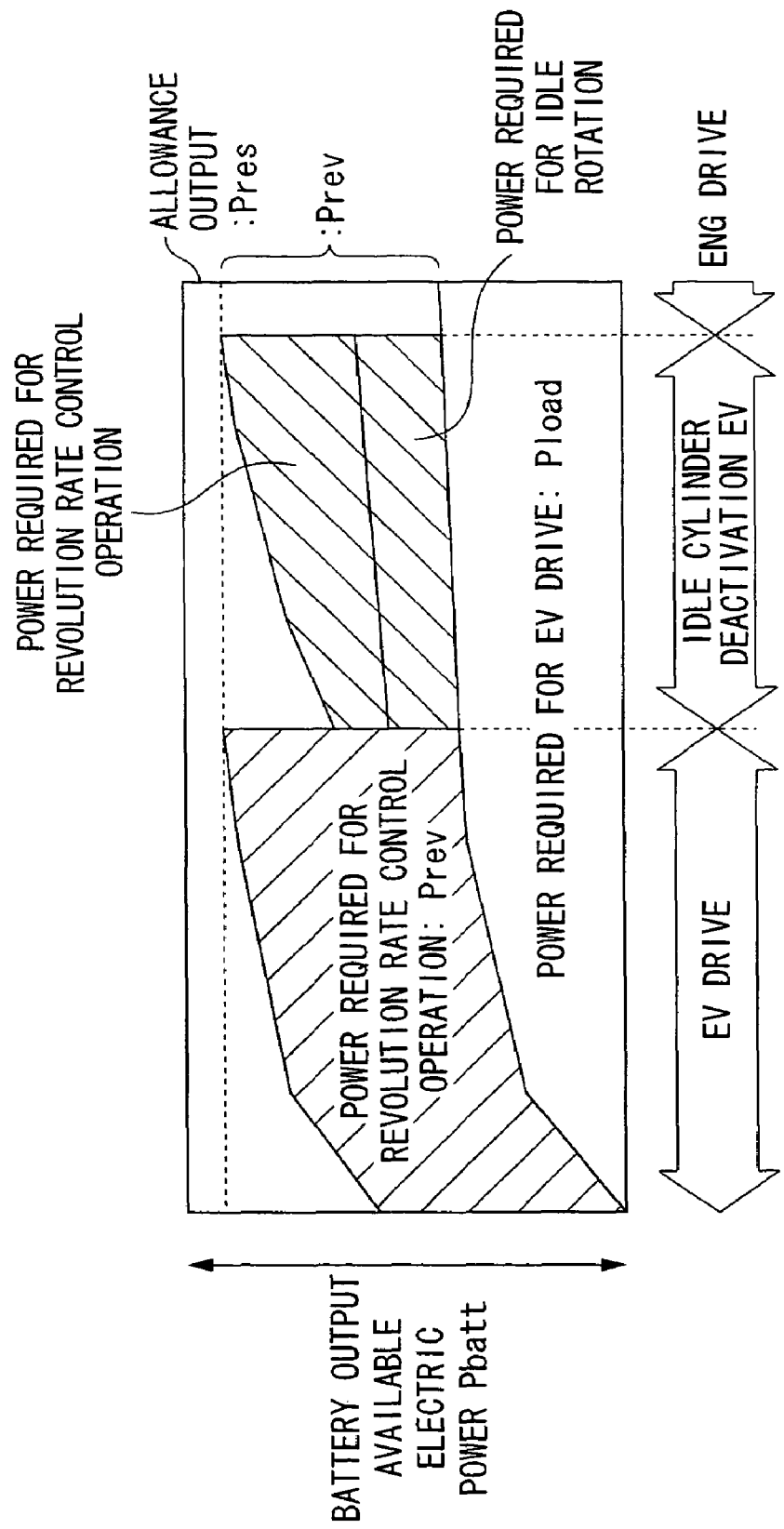
FIG. 15 is a graph illustrating the required electric power in each mode in an embodiment of the present invention.
Figure 16:
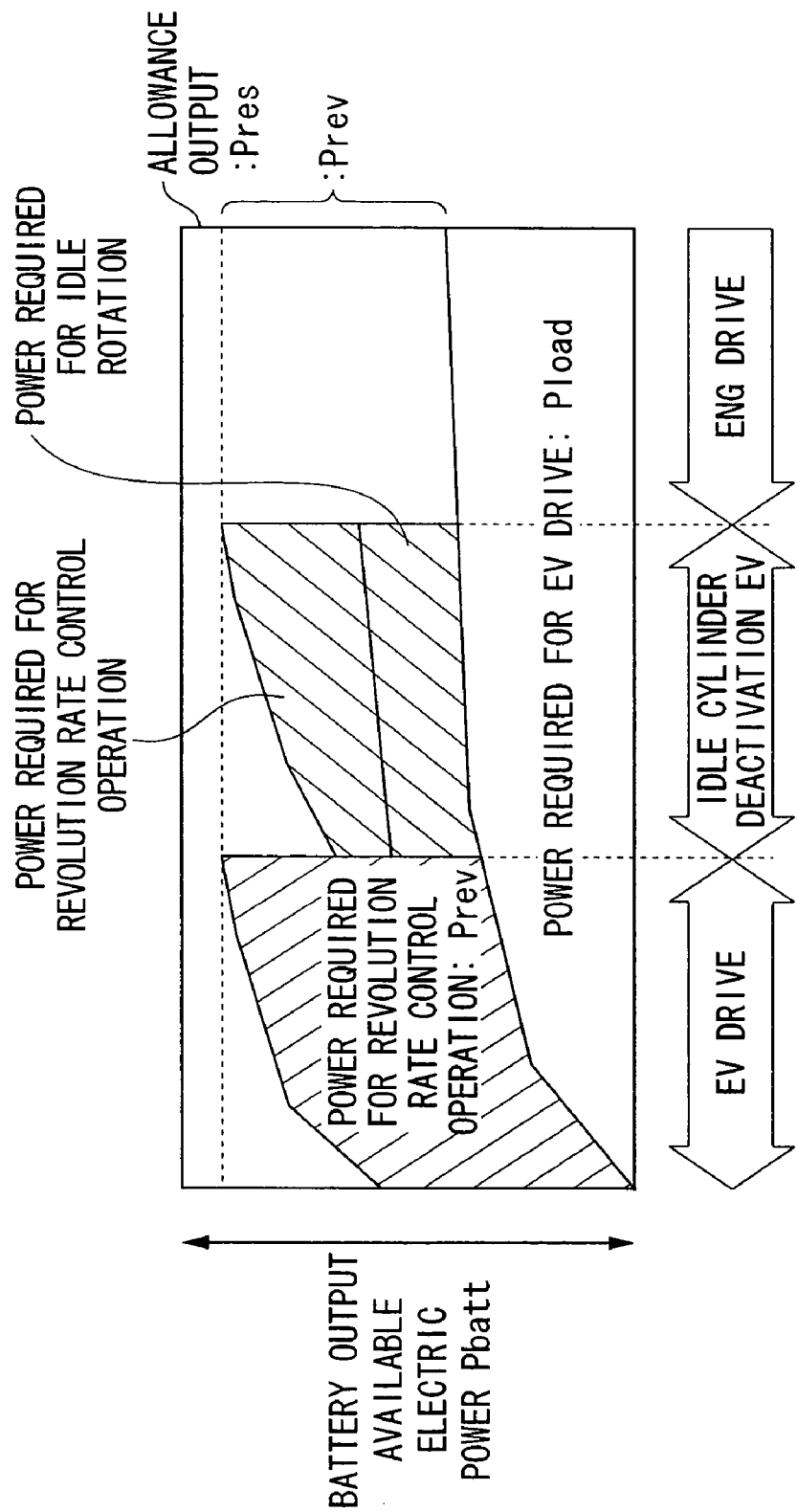
FIG. 16 is a graph illustrating the required electric power in each mode in a comparative example.

FIGS. 13 and 15 illustrate an example in which the transition rate (the time required to transition between modes) is changed according to the drive mode to be transitioned and the driving state of the vehicle according to this embodiment. FIGS. 14 and 16 illustrate a comparative example in which the transition rate remains constant regardless of the drive mode to be transitioned. As shown in the comparative example, when the transition rate remains constant, it is required to increase the number of rotations of the crank shaft motor M2 within a fixed time. Therefore, a relatively large amount of electric power for the revolution rate control operation required in the battery 7 should be reserved. As a result, even when the driver does not request an immediate acceleration request, for example, a transition of the drive mode takes place and the effect of improving the fuel consumption is limited accordingly.

On the other hand, in this embodiment of the present invention, the transition rate is modified according to the drive mode to be transitioned and the driving state of the vehicle. This allows modification of the required electric power according to the drive mode to be transitioned, and it is possible to drive the vehicle in the current drive mode while reserving electric power suitable to each of the drive modes. Thus, the engine stop EV drive mode allowable region and the idle cylinder deactivation EV drive mode allowable region can be enlarged, thereby improving the fuel consumption Furthermore, since the required electric power is modified according to the driving state of the vehicle, such as the acceleration intention by the driver, it is possible to further enhance the effect of improving the fuel consumption while maintaining good drivability. For example, when the driver does not request an immediate acceleration request, the transition rate is set to a moderate value and the electric power required for a transition of the drive mode can be saved. Accordingly, since it is possible to continue the current drive mode, the effect of improving the fuel consumption is enhanced.

Figure 17:
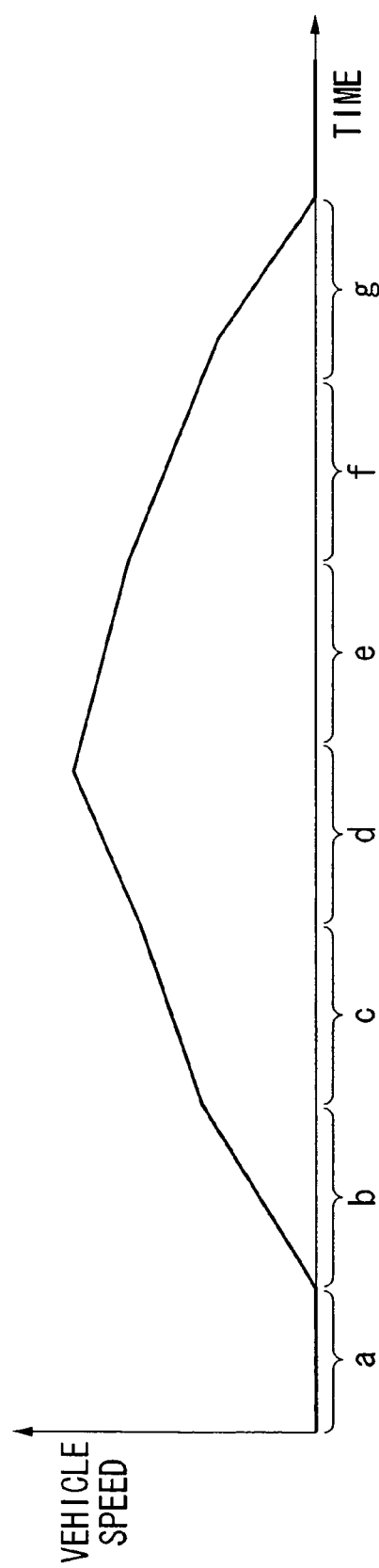
FIG. 17 is a diagram illustrating an example of the change in the vehicle speed over time for each drive mode.

The drive modes in this embodiment includes the idle stop mode (region a), the engine stop EV drive mode (region b), the idle cylinder deactivation EV drive mode (region c), the engine drive mode (region d), the engine drag rear regeneration mode (region e), the idle cylinder deactivation rear regeneration mode (region f), and the engine stop rear regeneration mode (region g). Operating statuses of the engine E, the front motor M2, the transmission T, and the clutch C and the rear motor M1 on the rear side in each mode are shown in FIG. 18. FIG. 17 is a diagram illustrating an example of the change in the vehicle speed over time for each drive mode.

In this embodiment, the clutch C is connected only when the driving force of the motor M1 is required, whereas the motor M1 is disconnected from the driving wheels Wr when such driving force is not required (in the engine drive mode). Accordingly, it is possible to reduce the friction from the motor M1, thereby contributing to an improvement in the fuel consumption. Furthermore, the transmission clutch between the engine E and the driving wheels Wf is connected only when the driving force of the engine E is required, whereas the engine E is disconnected from the driving wheels Wf when such driving force is not required (in the engine drive mode). Accordingly, it is possible to reduce the friction from the engine E, thereby contributing to an improvement in the fuel consumption.

As described above, in this embodiment, the engine E is configured to be an engine E that is capable of supporting a deactivation operation in which an intake valve and an exhaust valve are closeable, and the engine E is deactivated in the idle cylinder deactivation EV drive mode. Accordingly, it is possible to reduce the pumping loss involved in the open/close of the intake valve and the exhaust valve, in addition to stopping the fuel injection.

Furthermore, since the vehicle supports the idle cylinder deactivation EV drive mode in which the engine is maintained in the deactivation state while made to run in a predetermined number of revaluations (for example, the engine is made to run in the idle state), in addition to the engine stop EV drive mode and the idle cylinder deactivation EV drive mode. Accordingly, it is possible to transition to the engine drive mode by promptly driving the engine E, and the electric power required for the revolution rate control operation for raising the number of revolutions of the engine E can be reduced. Additionally, the electric power required for the revolution rate control operation for driving the engine E can be reduced when the mode transitions from the engine stop EV drive mode to the idle cylinder deactivation EV drive mode.

It should be noted that the present invention is not limited to the particular embodiment described above. For example, while an electric oil pump is used in the above embodiments, other types of pump, such as a mechanical pump, may be used.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle, the hybrid vehicle comprising:
    an engine as a first driving source for driving the vehicle, the engine being configured to support a deactivation operation in which an intake valve and an exhaust valve are closed;
    a motor as a second driving source for driving the vehicle;
    a power generator driven by the engine; and
    an electric storage device for storing regeneration energy from the power generator and the motor,
the control apparatus comprising a drive mode determination device that determines one drive mode from a plurality of drive modes based on a status of the vehicle,
wherein the drive modes comprise:
    an engine stop motor drive mode in which the vehicle is driven by a driving force from the motor while stopping the engine in a state in which cylinders of the engine are deactivated;
    an idle cylinder deactivation motor drive mode in which the vehicle is driven by the driving force from the motor by operating the power generator as an electric motor by running the engine in an idle state while maintaining the cylinders of the engine deactivated; and
    an engine drive mode in which the vehicle is driven by a driving force from the engine; and
    wherein the drive mode determination device determines that a mode transition from a current drive mode to another drive mode should take place, when an allowance output of the electric storage device is smaller than a threshold output of the electric storage device,
    wherein the threshold output is determined based on a current vehicle speed and is increased as the current vehicle speed increases, and
    wherein the allowance output is calculated using:
    the electric storage device output available electric power;
    a required electric power for performing either the engine stop motor drive mode or the idle cylinder deactivation motor drive mode; and
    an electric power used when the power generator works as an electric motor, which is determined at least according to a rate of a change in a degree of an opening of an accelerator pedal.

2. The control apparatus for a hybrid vehicle according to claim 1, further comprising a power generator electric power setting device that, when it is determined by the drive mode determination device that a mode transition from a current drive mode to another drive mode should take place, modifies a transition rate for transitioning from the current drive mode to the another drive mode according to the drive mode to be transitioned, wherein the power generator electric power setting device sets the electric power used when the power generator works as an electric motor based on an oil temperature of a transmission and an oil temperature of the engine.

3. The control apparatus for a hybrid vehicle according to claim 1, further comprising a power generator electric power setting device that, when it is determined by the drive mode determination device that a mode transition from a current drive mode to another drive mode should take place, modifies a transition rate for transitioning from the current drive mode to the another drive mode according to the drive mode to be transitioned, wherein the power generator electric power setting device sets the electric power used when the power generator works as an electric motor based on a charge status of the electric storage device.

4. The control apparatus for a hybrid vehicle according to claim 1, further comprising a power generator electric power setting device that, when it is determined by the drive mode determination device that a mode transition from a current drive mode to another drive mode should take place, modifies a transition rate for transitioning from the current drive mode to the another drive mode according to the drive mode to be transitioned, wherein the power generator electric power setting device sets the electric power used when the power generator works as an electric motor based on a target transition rate.

5. The control apparatus for a hybrid vehicle according to claim 1, further comprising a straight ahead or turning determination device that determines whether the vehicle is traveling straight ahead or turning;

wherein a target number of revolutions of the engine is changed according to a driving state determined by the straight ahead or turning determination device.

6. The control apparatus for a hybrid vehicle according to claim 1, further comprising a road state determination device that determines whether a road on which the vehicle is traveling is a flat road or a climbing road, wherein a target number of revolutions of the engine is changed according to a road state determined by the road state determination device.

7. The control apparatus for a hybrid vehicle according to claim 1, wherein the engine drives one pair of the rear wheels and front wheels of the hybrid vehicle and the motor drives another pair of the rear wheels and the front wheels.

8. The control apparatus for a hybrid vehicle according to claim 1, wherein a clutch is interposed between the motor and driving wheels of the hybrid vehicle.

9. The control apparatus for a hybrid vehicle according to claim 1, wherein a clutch is interposed between the engine and driving wheels of the hybrid vehicle.

* * * * *